(12) United States Patent
Love et al.

(10) Patent No.: US 8,542,656 B2
(45) Date of Patent: Sep. 24, 2013

(54) SYSTEM AND METHOD FOR DOWNLINK SIGNALING FOR HIGH SPEED UPLINK PACKET ACCESS

(75) Inventors: Robert T Love, Barrington, IL (US); Michael J Carney, Libertyville, IL (US); Amitabha Ghosh, Buffalo Grove, IL (US); Rapeepat Ratasuk, Hoffman Estates, IL (US); Weimin Xiao, Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 564 days.

(21) Appl. No.: 12/723,392

(22) Filed: Mar. 12, 2010

(65) Prior Publication Data

US 2010/0165951 A1 Jul. 1, 2010

Related U.S. Application Data

(63) Continuation of application No. 11/193,207, filed on Jul. 29, 2005, now Pat. No. 7,693,110.

(60) Provisional application No. 60/610,261, filed on Sep. 16, 2004.

(51) Int. Cl.
*H04W 36/00* (2009.01)

(52) U.S. Cl.
USPC ............ 370/332; 370/328; 370/331; 455/436

(58) Field of Classification Search
USPC .............. 370/332, 236, 395.5, 474, 350, 346, 370/336; 375/219–220, 227, 228, 295, 316; 455/550.1, 403, 404.2, 434, 515, 436–439
See application file for complete search history.

(56) References Cited

U.S. PATENT DOCUMENTS

| 5,673,259 | A | 9/1997 | Quick, Jr. | |
| 7,126,928 | B2 * | 10/2006 | Tiedemann et al. | 370/329 |

(Continued)

FOREIGN PATENT DOCUMENTS

| CN | 1313686 A | 9/2001 |
| EP | 1134994 A1 | 9/2001 |

(Continued)

OTHER PUBLICATIONS

"3rd Generation Partnership Project; Technical Specification Group Radio Access Network; Physical channels and mapping of transport channels onto physical channels (FDD) (Release 5)," 3GPP TS 25.211 V5.3.0 (Dec. 2002) Technical Specification, 51 pages.

(Continued)

*Primary Examiner* — Cong Tran

(57) ABSTRACT

A wireless communication system (100) and method for providing high speed uplink packet access from user equipment (128, 130) to a base station (114, 116, 118, 120). Each of the user equipment (128, 130) and the base station (114, 116, 118, 120) includes a transmitter (1106, 1206), a receiver (1104, 1204), and a controller (1108, 1208) coupled to the transmitter and the receiver. Data packets are transmitted from the user equipment (128, 130) to the base station (114, 116, 118, 120). Control information, corresponding to the data packets, is transmitted from the base station (114, 116, 118, 120) to the user equipment (128, 130). The control information includes at least a control channel acknowledgement field in an absolute grant channel assigned to the user equipment (128, 130). The controller (1108) of the user equipment (128, 130) is configured to utilize the channelization code(s) in response to handoff and/or entering an active channel state.

5 Claims, 13 Drawing Sheets

(56) References Cited

U.S. PATENT DOCUMENTS

| | | | |
|---|---|---|---|
| 7,808,920 B2 | 10/2010 | El-Maleh et al. | |
| 2002/0064133 A1 | 5/2002 | Chen et al. | |
| 2002/0172217 A1 | 11/2002 | Kadaba et al. | |
| 2003/0076812 A1* | 4/2003 | Benedittis | 370/350 |
| 2005/0020309 A1* | 1/2005 | Moeglein et al. | 455/561 |
| 2005/0041618 A1* | 2/2005 | Wei et al. | 370/328 |

FOREIGN PATENT DOCUMENTS

| | | | |
|---|---|---|---|
| WO | 0103357 | A | 1/2001 |
| WO | 0124568 | A | 4/2001 |
| WO | 0245291 | A | 6/2002 |
| WO | 2004034656 | A2 | 4/2004 |
| WO | 2004042992 | A1 | 5/2004 |
| WO | 2004062205 | A1 | 7/2004 |
| WO | 2004075473 | A1 | 9/2004 |

OTHER PUBLICATIONS

"3rd Generation Partnership Project; Technical Specification group Radio Access Network; DRAFT Multiplexing and channel coding (FDD) (Release 5)", 3GPP TS 25.212 V5.2 DRAFT (Sep. 2002) Technical Specification, 76 pages.
3rd Generation Partnership Project; Technical Specification Group Radio Network; Physical layer procedures (FDD) (Release 5); 3GPP TS 25.214 V5.4.0 (Mar. 2003) Technical Specification, 63 pages.
"3rd Generation Partnership Project; Technical Specification Group Radio Access Network; Spreading and modulation (FEE) (Release 5)", 3GPP TS 25.213 V5.5.0 (Dec. 2003) Technical Specification, 28 pages.
"Downlink Control Channel Structure for Enhanced Uplink", TSG RAN WG1 #37, XP-002360422, May 10-14, 2004, pp. 12, Montreal, Canada.
"Enhanced Uplink—Scheduling", TSG-RAN WG1 #38, Cannes, Jun. 21-24, 2004, 6 pages, XP-002322112.
3rd Generation Partnership Project; Technical Specification Group Radio Access Network; Feasibility Study for Enhanced uplink for UTRA FDD (Release 6)', 3GPP TR 25.896 V6.0.0 (Mar. 2004) Technical Report, 179 pages.
Ericsson, "Downlink Control Signaling", TSG-RAN WG1 #38, Aug. 16-20, 2004, pp. 4 pages, R1-040957, vol. 8.1, Prague, Czech Republic.
Japanese Patent Office, "Office Action", Oct. 18, 2011, Japanese Pat. Appln. No. 2008-208127, 30 pages.
State Intellecutual Property Office of the People's Republic of China, "First Office Action" for Application No. 20058003115.6 Jun. 19, 2009, 11 pages.
USPTO, "Non-Final Rejection" for U.S. Appl. No. 12/723,383 May 16, 2011, 8 pages.
European Patent Office, "Exam Report" for EPO Patent Application No. 10001803.5 D01 dated Dec. 21, 2012, 8 pages.
3GPP TSG RAN1+RAN2 Adhoc, Tdoc#R1-040675 "Scheduling and signaling information for Enhanced Uplink" Motorola; Cannes, France; Jun. 21-24, 2004, 3 pages.
3GPP TSG RAN WG1 #38bis, R1-041185 "E-DCH Scheduling—UE Grant Procedures" Ericsson; Seoul, Korea; Sep. 20-24, 2004; 4 pages.
3GPP TSG RAN WG1 #38, R1-040910 "Scheduling and signaling information for Enhanced Uplink" Motorola; Prague, Czech Republic, Aug. 16-20, 2004, 7 pages.
3GPP TSG RAN WG1 #38 R1-040907 "Rate Control Scheduler for Enhanced Uplink" Motorola; Prague, Czech Republic; Aug. 16-20, 2004; 6 pages.
3GPP TSG RAN WG1 #38bis, R1-041177 "Downlink Control Signaling" Ericsson; Seoul, Korea; Sep. 20-24, 2004, 7 pages.

* cited by examiner

SYSTEM AND METHOD FOR DOWNLINK SIGNALING FOR HIGH SPEED UPLINK PACKET ACCESS

CROSS REFERENCE TO RELATED APPLICATIONS

The present application is a continuation of co-pending and commonly assigned U.S. application Ser. No. 11/193,207, filed Jul. 29, 2005, which claims priority to U.S. Provisional Application No. 60/610,261, filed Sep. 15, 2004, from which benefits under 35 USC 120 are hereby claimed and the contents of which are incorporated herein by reference.

FIELD OF THE INVENTION

The present invention relates generally to the field of wireless communication systems, and methods thereof, for providing high speed communication to and from a wireless communication device. In particular, the present invention relates to wireless communication systems, and methods thereof, that provide high speed uplink packet access between base stations and mobile handsets.

BACKGROUND OF THE INVENTION

Many wireless communication systems communicate voice and data information between communication infrastructure and user equipment using a standard wireless communication protocol. Data information includes information necessary for network browsing, messaging, and multimedia applications. In order to develop improved wireless communication systems having higher communication speeds than existing systems, new standards for managing and handling these improved systems are desired.

Methods for handling high speed communications include High Speed Downlink Packet Access (HSDPA) service and High Speed Uplink Packet Access service (HSUPA). HSDPA is a method for supporting downlink packet data that has been generally defined. Currently, standardisation efforts include the definition of HSUPA for efficiently supporting packet data communication in the uplink direction.

HSDPA and HSUPA use a number of similar techniques including incremental redundancy and adaptive transmit format adaptation. In particular, HSDPA and HSUPA provide for modulation formats and code rates to be modified in response to dynamic variations in the radio environment. Furthermore, HSDPA and HSUPA use a retransmission scheme known as Hybrid Automatic Repeat reQuest (H-ARQ). In the H-ARQ scheme, incremental redundancy is provided by a use of soft combining of data from the original transmission and any retransmissions of a data packet. Thus, when a receiver receives a retransmission, it combines the received information with information from any previous transmission of the data packet. The retransmissions may comprise retransmissions of the same channel data or different channel data may be transmitted. For example, retransmissions may comprise additional redundant data of a Forward Error Correcting (FEC) scheme. The additional encoding data may be combined with encoded data of previous transmissions and a decoding operation may be applied to the combined data. Hence, the retransmission may effectively result in a lower rate (higher redundancy) encoding of the same information data.

Although HSDPA and HSUPA use many similar techniques, HSUPA provides a number of additional complications with respect to HSDPA and not all techniques used for the downlink transmissions are directly applicable to the uplink scenario. In particular for UMTS, scheduling of data for communication over the air interface is performed by the network rather than in the mobile devices. Specifically for HSDPA and HSUPA, aspects of the scheduling are performed in the individual base stations scheduling a user in order to minimize scheduling delays. This permits the air interface communication to be adapted to the dynamic variations in the radio environment and facilitates link adaptation.

For HSDPA the data to be transmitted is available at the base station and in particular the base station includes downlink transmit data buffers. Furthermore, HSDPA provides for transmissions to be made from only one base station and does not support soft handovers where the same data is simultaneously transmitted from a plurality of base stations to the same mobile device. Accordingly, the scheduling by the base station is relatively simple as the information required is available at the base station and as the scheduling by one base station may be made independently of other base stations.

However, in HSUPA, the data to be scheduled is the data which is to be transmitted from the mobile devices. Accordingly, it is important to have an efficient signaling scheme between the mobile devices and the base stations in order to allow the base stations to schedule data from the mobile devices and for the mobile devices to operate in accordance with the scheduling.

Furthermore, HSUPA provides for the use of soft handovers in which a transmission from a mobile device may be simultaneously received by a plurality of base stations with the received signals being combined in the network. However, as the scheduling is performed by one base station in HSUPA, other base stations do not have any information on when the mobile device may transmit. Accordingly, all base stations which may be involved in a soft handover, continuously attempt to receive data transmissions from the mobile device. This requires that the base stations continuously despread the received signals with all spreading codes of mobile devices which potentially may be active. However, as the mobile devices typically transmit only for a fraction of the time, this results in a very high resource usage and in particular results in a large part of the computational resource of the receiver being used to monitor for potential transmissions from mobile devices. Similarly, mobile devices must monitor the downlink signaling from each base station involved in a soft handover where each base station may use multiple channelization codes to send the necessary signaling to the mobile stations thus requiring the mobile to decode multiple channelization codes to determine when and if it is being signalled. Mobile station complexity increases when it must decode multiple channelization codes per cell and channelization codes from multiple cells hence the number of channelization codes a mobile station must decode should be minimized. Also depending on the application type, some forms of scheduling are more optimal than others. For example, 'time and rate' scheduling is better when tight control of the quality of server (QoS) is required or larger overhead from signaling can be tolerated. For example, this might occur in a 'hot spot' coverage area where the mobile stations are quite close to the base station and may even have line of site. Other types of scheduling such as 'rate control' scheduling may be better when only low signaling overhead can be tolerated such as in multi-coverage regions in a macro-cell topology or the applications tend to be best effort like uploading e-mail or low data rate streaming. For applications with low latency requirements the frame size is also important since this can drive much of the physical delay component of the end to end delay experienced by the user (mobile station).

A larger frame size can help with coverage issues typically occurring at the edge of the cell or network. Hence, both small and large frame sizes (i.e. small and large transmission time intervals—TTIs) are useful when supported by a high speed uplink packet access network and mobile stations.

There is a need for a system and method for minimizing the number of channelization codes that user equipment must monitor per active set cell. There is a further need for a downlink signaling structure that supports 'rate control and 'time and rate' scheduling as well as small and large frame sizes.

DETAILED DESCRIPTION OF THE PREFERRED EMBODIMENTS

Figure 1:
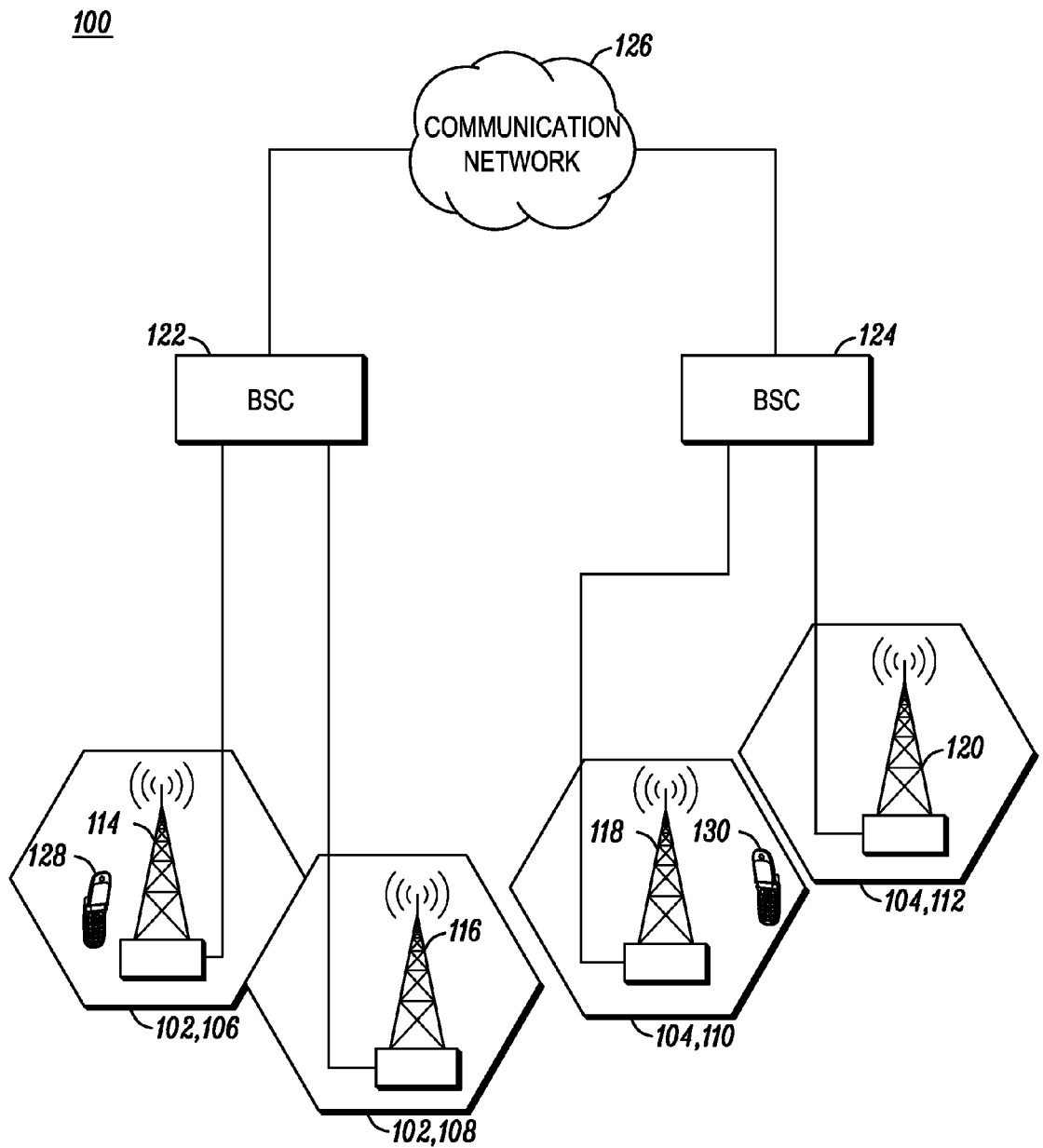
FIG. 1 is a schematic diagram of a wireless communication system representing mobile devices communication with a wireless communication infrastructure in accordance with the present invention.

One aspect of the present invention is user equipment for providing high speed uplink packet access to a base station comprising a transmitter, a receiver, and a controller coupled to the transmitter and the receiver. The transmitter is configured to transmit data packets to the base station. The receiver is configured to receive control information from the base station which corresponds to the data packets transmitted to the base station. The control information includes at least a control channel acknowledgement field in an absolute grant channel assigned to the user equipment. The controller is configured to utilize the control channel acknowledgement field in response to one of handoff and entering an active channel state.

Another aspect of the present invention is a base station for receiving high speed uplink packet access from user equipment comprising a transmitter, a receiver, and a controller coupled to the transmitter and the receiver. The receiver is configured to receive data packets from the user equipment. The transmitter is configured to transmit control information to the user equipment which corresponds to the data packets received from the user equipment. The control information includes at least a busy bit to disable uplink transmission of a transmitter of the user equipment. The controller is configured to disable the transmitter of the user equipment based on the busy bit upon one of handoff and entering an active channel state.

Yet another aspect of the present invention is a method of a base station for receiving high speed uplink packet access from user equipment. An absolute grant indicator associated with a first stop-and-wait interval of a reoccurring series of stop-and-wait intervals is transmitted to the user equipment. Next, a packet is received from the user equipment on a first channel, and control information associated with the packet is received from the user equipment on a second channel. Thereafter, the packet received on the first channel is decoded based on the control information received on the second channel.

A scheduling cell is an active set cell that a mobile device, i.e., user equipment, receives grants or other scheduling signaling. An active set cell is a cell in communication with a mobile device. Multiple cells are likely to be in the active set when a mobile device is in a multi-coverage region. Such a multi-coverage region is typically referred to as a soft handoff region where a mobile device can simultaneously communicate with the cells that have coverage in that region after they have been included in the active set. When a new cell is added to the mobile device's active set in addition to one or more other cells then the mobile device is in soft handoff (if newly added cell is of a different cell site) or softer handoff (the newly added cell of the same cell site) with the new cell. As well as adding and deleting cells from the active set (i.e., adding or dropping soft or softer handoff cells), there may also be active set cell handoffs such that the best active set cell controls a mobile device either through scheduling grants or through up/down commands that control the mobile device's maximum allowed data rate, power levels, or power ratios.

'Time and rate' scheduling refers to the case when an active set Base station uses scheduling grants to control the rate or power levels and the scheduling interval of mobile devices. The scheduling interval is the time interval over which the mobile device is permitted to transmit or relates to the number of outstanding packets allowed over some time duration.

'Rate control' scheduling refers to the case when an active set base station uses signaling to control some mobile device attribute that mobile devices use to determine their transmission rate or power level while not directly determining mobile device transmission start times or transmission duration.

Referring to FIG. 1, there is provided an example of a wireless communication system 100, such as a wireless radio access network (RAN), comprising multiple cell sites 102, 104 in which each cell site includes multiple cells 106, 108, 110, 112. Each cell 106, 108, 110, 112 includes a base station, a.k.a., a Node-B, 114, 116, 118, 120 and may be controlled by a base station controller or Radio Network Controller (RNC) 122, 124. The base station controllers 122, 124 may communicate with other landline or wireless components via a communication network 126. Mobile stations or devices 128, 130 communicate with one or more base stations 114, 116, 118, 120 over wireless fading multi-path channels. Signaling and control information may also be supported over the wireless channels. A mobile device or user equipment 128, 130 may have simultaneous communication channels with more than one cell, or base station 114, 116, 118, 120, such as when the mobile device is in a soft or softer handoff state involving multiple cells in which the cells have been placed in the mobile device's active set as part of the handoff process.

Wireless communication links or connections utilized by the wireless communication system 100 include, but are not limited to, cellular-based communications such as analog communications (using AMPS), digital communications (using CDMA, TDMA, GSM, iDEN, GPRS, or EDGE), and next generation communications (using UMTS or WCDMA) and their variants; a peer-to-peer or ad hoc communications such as HomeRF, Bluetooth, IEEE 802.11 (a, b or g) and IEEE 802.16 (a, d, or e); and other forms of wireless communication such as infrared technology.

Figure 2A:
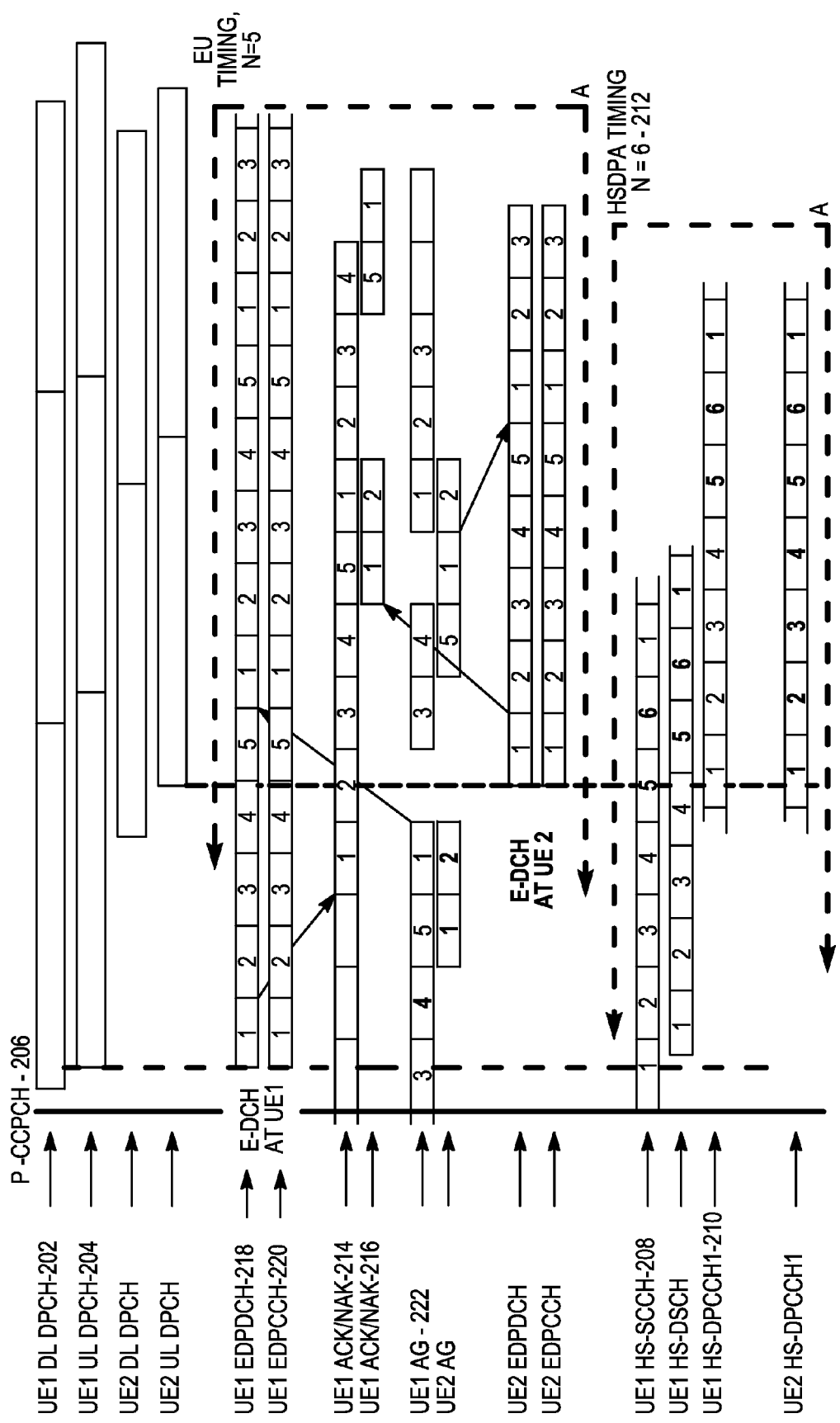
FIGS. 2A and 2B are timing diagrams of a scheduling cell servicing multiple mobile devices in accordance with the present invention.

Referring to FIG. 2A, there is shown an example 200 of the timing of a cell servicing multiple mobile devices. The cell supports uplink (UL DPCH) 204 and downlink (DL DPCH) 202 dedicated physical channels which are time offset from the starting time of the primary common control physical channel (P-CCPCH) 206 by a frame and chip offset determined by the network and signaled to each mobile device on call origination or handover. The timing for the downlink (HS-SCCH) 208 and uplink (HS-DPCCH) 210 physical channels supporting high speed downlink packet access (HS-DPA) 212 are shown which highlight the support of N-channel stop-and-wait Hybrid ARQ via the numbering (for example, 1 through 6 for the embodiment shown in FIG. 2A) assigned to each of the N channels, such as where N=6. Also included are the timing for the proposed downlink channels 214, 216 and uplink dedicated physical data (E-DPDCH) 218 and control (E-DPCCH) 220 channels supporting high speed uplink packet access (HSUPA) for 'time and rate' scheduling, again highlighting the support of N channel stop-and-wait Hybrid ARQ protocol by the numbering (for example, 1 through 5) assigned to each of the N channels where, for example, for the embodiment shown in FIG. 2B, N=5 and the TTI size is 2 ms. The proposed downlink channels include an ACK channel 214 and an Absolute Grant channel 216. It should be noted that the E-DPDCH 218 and E-DPCCH 220 are time aligned with the UL DPCH 202. The downlink HSUPA channel start times are time aligned with the P-CCPCH 206.

As shown in FIG. 2A, user equipment or mobile device (UE1) 222 may transmit a packet on the E-DPDCH 218 for a TTI corresponding to stop-and-wait channel 1 as well as transmitting associated control information on E-DPCCH 220 in response to receiving an absolute grant (not shown) corresponding to stop-and-wait channel 1. The scheduling cell (e.g. scheduling base station), upon receiving and decoding the packet transmission sent on the E-DPDCH 218 by using the control information sent on the E-DPCCH 220, transmits and ACK on the ACK channel 214 assigned to the mobile device if the packet was successfully decoded or transmits an NACK otherwise. In another embodiment, an implicit NACK may be used where nothing is transmitted (i.e. discontinued transmission (DTX)) when the packet decoding is unsuccessful. Also, if the mobile device is in soft handoff with other cells, they may also send ACK/NACK information on a ACK channel for the mobile device to determine if the packet was successfully decoded by the network or not. At the same or similar time, the ACK or NACK may be sent on the ACK channel 214 in response to the packet received on stop-and-wait channel 1. The scheduling cell may schedule the next transmission for stop-and-wait channel 1 by sending an absolute grant on the absolute grant channel on the TTI corresponding to stop-and-wait channel 1. Upon reception of the absolute grant channel, the mobile device may then transmit a packet on the TTI corresponding to the next occurrence of stop-and-wait channel 1. It should be noted that this procedure may be followed for each of the N stop-and-wait channels used. Also, there may be multiple AG channels since more than one mobile device may be scheduled to transmit for the same TTI. In one embodiment, a mobile device may need to monitor multiple channels and determine which channel it has been assigned based on some unique identifier. Alternatively, an absolute grant channel may be assigned to each user (for example on handover or when the mobile device enters an active channel state with that cell) but this may be inefficient if a large number of mobile devices is to be supported by a cell. Finally, an absolute grant indicator field may be included in the absolute grant channel itself which would identify which absolute grant channel the mobile device should use on the next or subsequent transmissions. Initially, the mobile device may be assigned a specific absolute grant channel to monitor at handover or when it entered an active channel state with a cell. The absolute grant channel to monitor may then be changed by use of the AGI field. In case of an error condition, the mobile device and scheduling cell may either go back to the AG channel that they last received a correct transmission on or (more simply) go to the AG channel assigned at handoff or assigned at the start of the active channel state. To reduce the possible AG channels the mobile device must consider, the total AG channels may be divided into sets such that a mobile device is assigned a set with only four possible AG channels such that the AG indicator would then only have four possible values each corresponding to one of the four AG channels. Using sets would also serve to reduce the number of bits required for the AG indicator field sent on the AG channel.

Figure 2B:
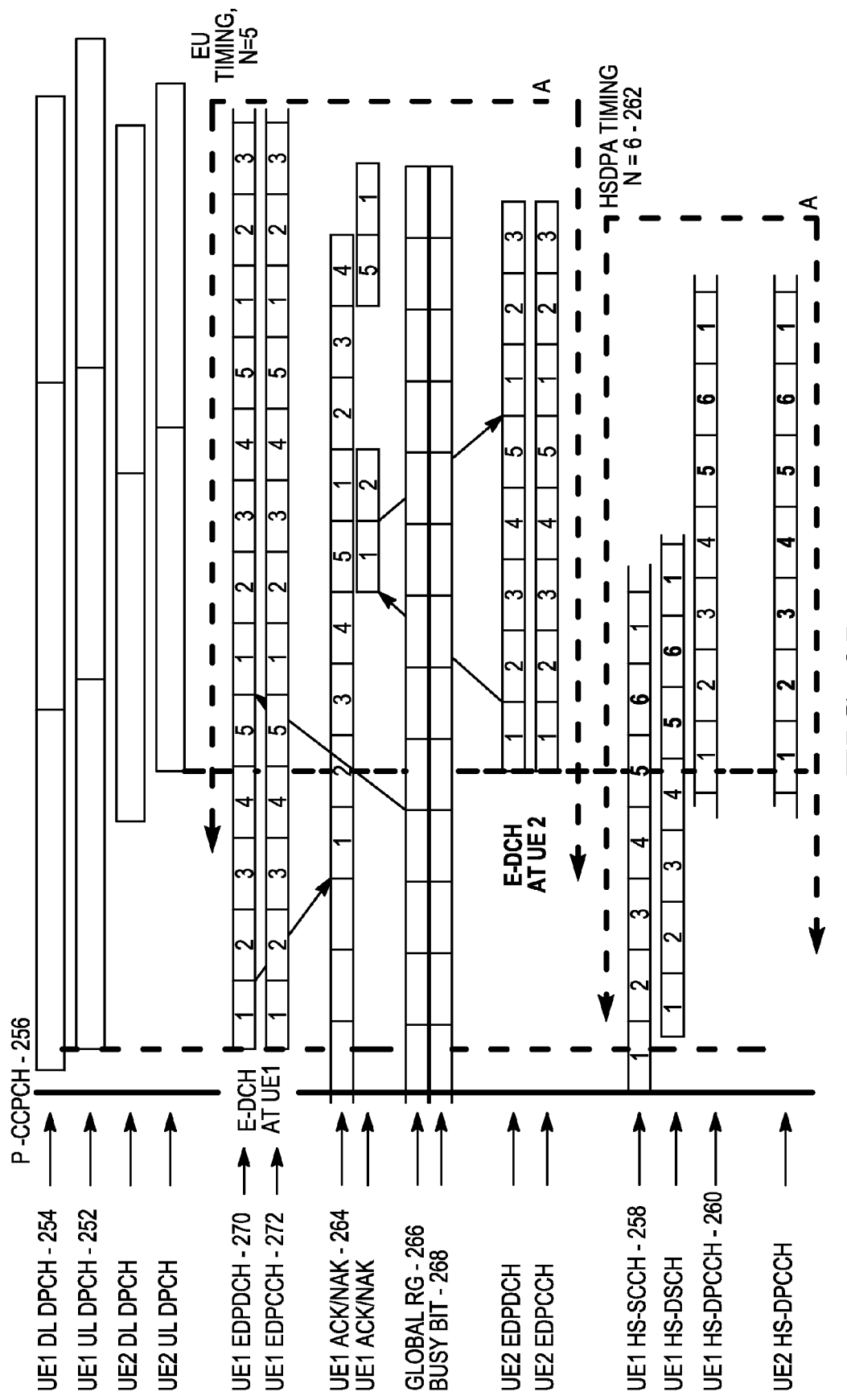

Referring to FIG. 2B, there is shown another example 250 of the timing of a cell servicing multiple mobile devices. The cell supports uplink (UL DPCH) 252 and downlink (DL DPCH) 254 dedicated physical channels which are time offset from the starting time of the primary common control physical channel (P-CCPCH) 256 by a frame and chip offset determined by the network and signaled to each mobile device on call origination or handover. The timing for the downlink (HS-SCCH) 258 and uplink (HS-DPCCH) 260 physical channels supporting high speed downlink packet access (HSDPA) 262 are shown which highlight the support of N-channel stop-and-wait Hybrid ARQ via the different numbering assigned to each of the N channels (for example, where in this case is N=6). Also included are the timing for the proposed downlink 264, 266, 268 channels and uplink dedicated physical data (E-DPDCH) 270 and control (E-DPCCH) 272 channels supporting high speed uplink packet access (HSUPA) for 'rate control' scheduling again highlighting the support of N channel stop-and-wait Hybrid ARQ protocol by the different numbering assigned to each of the N channels where in this case N=5 and the TTI size is 2 ms. The proposed downlink may include an ACK channel 264, a global relative grant channel 266, a global Busy bit 268, and optionally a per mobile device busy bit (not shown). It should be noted that the E-DPDCH 270 and E-DPCCH 272 are time aligned with the UL DPCH 252. The downlink HSUPA channel start times are time aligned with the P-CCPCH 256. In another embodiment the E-DPDCH 270 and E-DPCCH 272 are time aligned with the HS-DPCCH 260.

As shown in FIG. 2B, user equipment or mobile device (UE1) transmits a packet on the E-DPDCH 270 for a TTI corresponding to stop-and-wait channel 1 as well as transmitting associated control information on E-DPCCH 272. Prior to the packet transmission on the E-DPDCH 270, the mobile device may used relative grant information sent on the global relative grant channel 266 by the scheduling cell to help determine what rate or power level to use when sending the packet such that the overall interference at the scheduling cell is controlled to a targeted level. The scheduling cell, upon receiving and decoding the packet transmission sent on the E-DPDCH 218 by using the control information sent on the E-DPCCH 220, may transmit an ACK on the ACK channel 214 assigned to the mobile device if the packet was successfully decoded or transmits an NACK otherwise. In another embodiment an implicit, NACK may be used were nothing is transmitted (i.e., discontinued transmission (DTX)) when the packet decoding is unsuccessful. Also, if the mobile device is in soft handoff with other cells, they would also send ACK/NACK information on a ACK channel for the mobile device to determine if the packet was successfully decoded by the network or not. If the busy bit is transmitted on the global busy bit channel 268 or the per mobile device busy bit channel, then the mobile device will not start transmitting on subsequent TTIs until busy bit transmission is discontinued. It should be noted that this procedure is followed for each of the N stop-and-wait channels used.

Figure 3A:
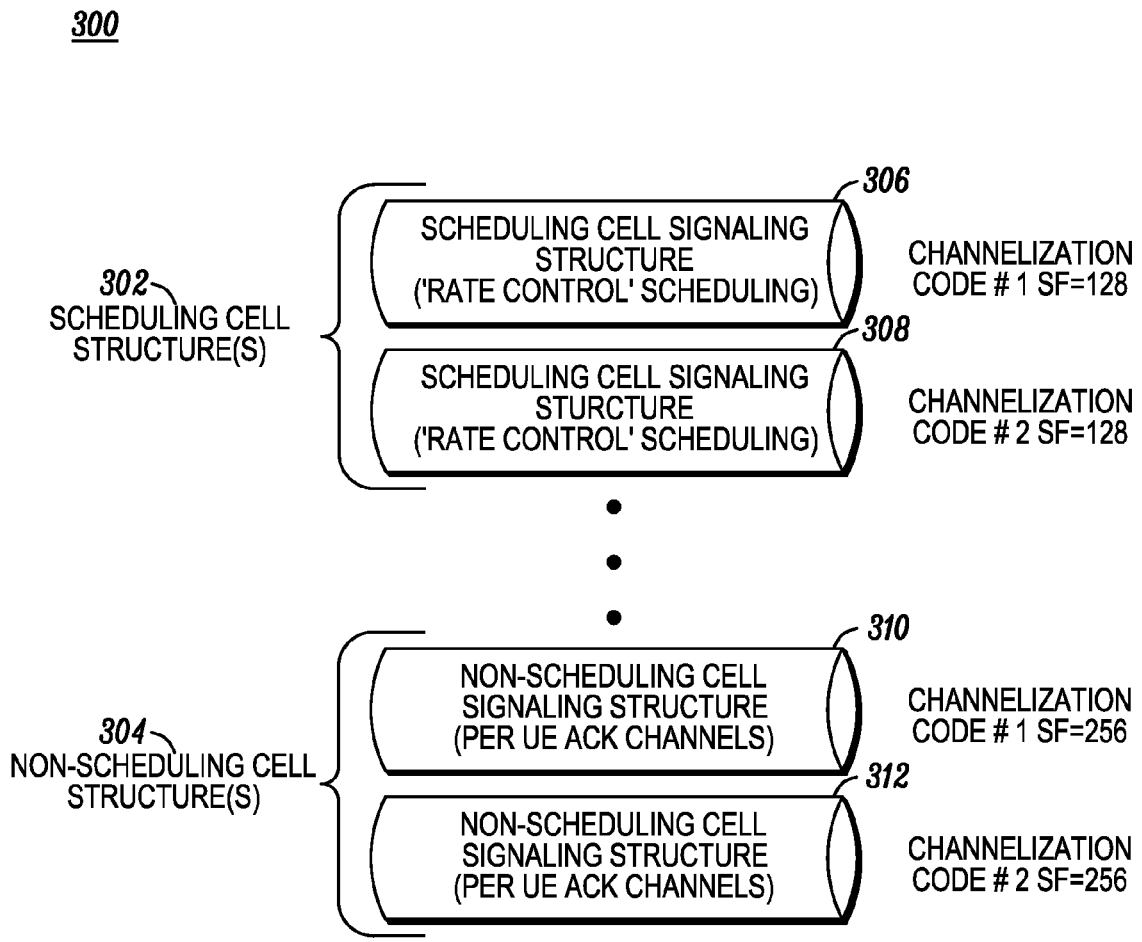
FIGS. 3A through 3D are schematic diagrams representing downlink control channels supporting uplink data communications in accordance with the present invention.

Referring to FIG. 3A, there is shown instantiations of the downlink control channels 300 to support uplink data communications in a high speed packet access network using 'rate control' scheduling. The downlink control channels 300 for 'rate control' scheduling comprise scheduling cell structure(s) 302 and non-scheduling cell structure(s) 304. The scheduling cell structure(s) 302 include a scheduling cell signaling structure 306 and may include one or more additional scheduling cell signaling structures 308. Likewise, the non-scheduling cell structure(s) 304 include a non-scheduling cell signaling structure 310 and may include one or more additional non-scheduling cell signaling structures 312.

Figure 3B:
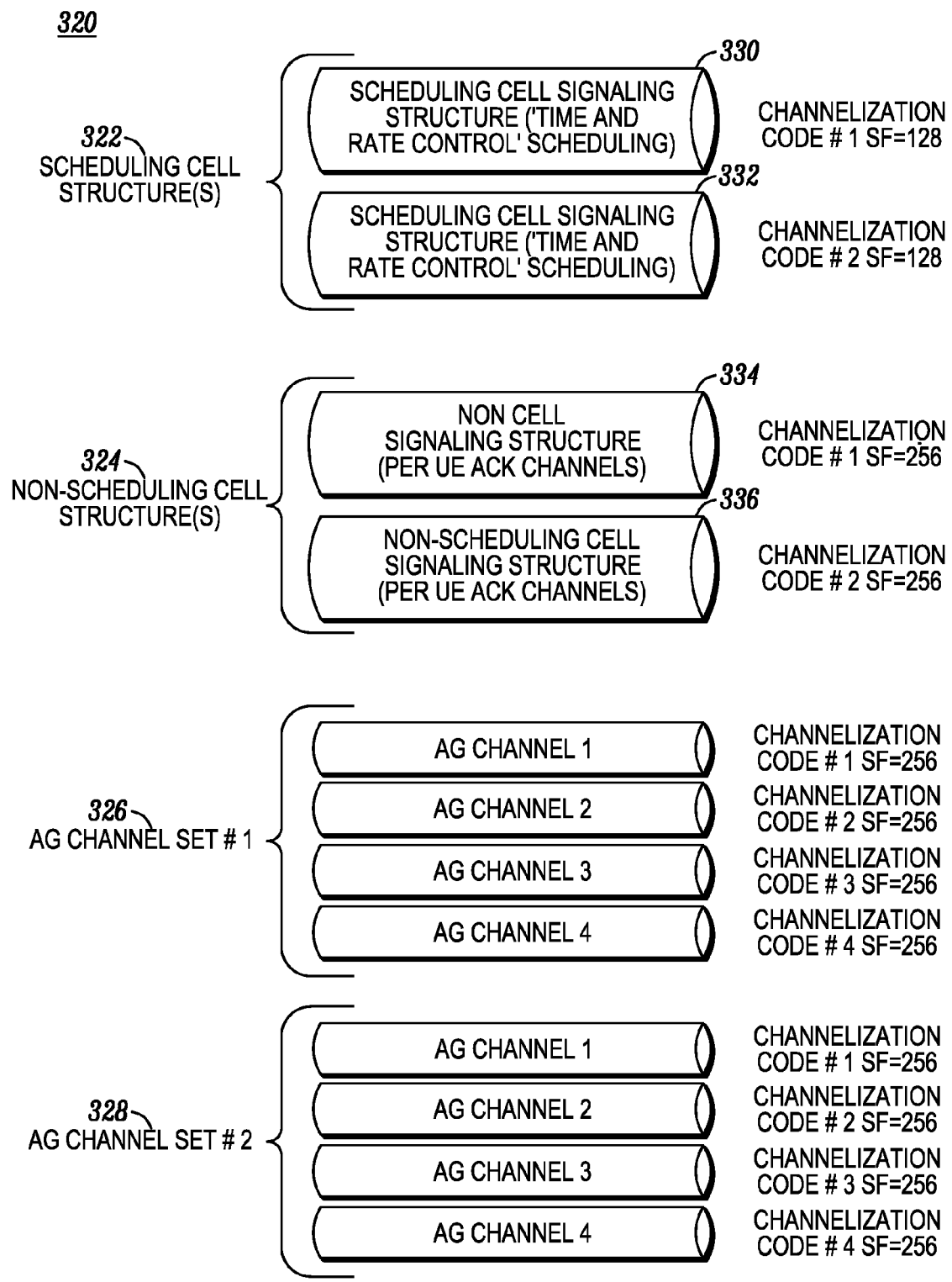

Referring to FIG. 3B, there is shown instantiations of the downlink control channels 320 to support uplink data communications in a high speed packet access network using 'time and rate' scheduling. The downlink control channels 320 for 'time and rate' scheduling comprise scheduling cell structure(s) 322, non-scheduling cell structure(s) 324, and one or more absolute grant (AG) channel sets 326, 328. The scheduling cell structure(s) 322 include a scheduling cell signaling structure 330 and may include one or more additional scheduling cell signaling structures 332. Likewise, the non-scheduling cell structure(s) 324 include a non-scheduling cell signaling structure 334 and may include one or more additional non-scheduling cell signaling structures 336. Each set of AG channels 326, 328 may include a plurality of AG channels.

Figure 3C:
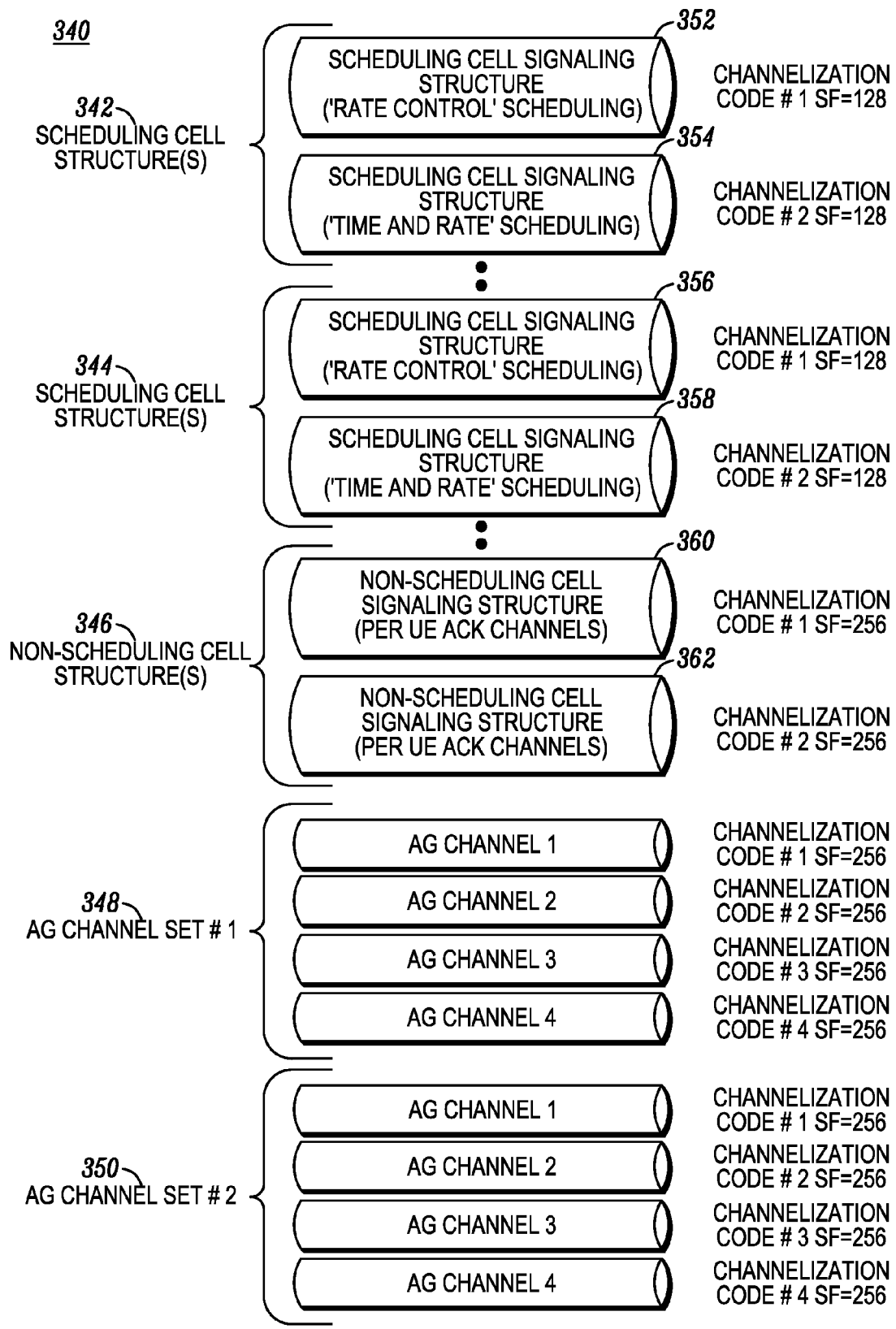

Referring to FIG. 3C, there is shown instantiations of the downlink control channels 340 to support uplink data communications in a high speed packet access network using both 'rate control' and 'time and rate' scheduling. Mobile devices are either assigned the 'rate control' or the 'time and rate' signaling structure channelization code on active set handoff or when entering the active state. The downlink control channels 340 for 'rate control' and 'time and rate' scheduling comprise scheduling cell structure(s) for 'rate control' scheduling 342, scheduling cell structure(s) for 'time and rate' scheduling 344, non-scheduling cell structure(s) 346, and one or more absolute grant (AG) channel sets 348, 350. The scheduling cell structure(s) for 'rate control' scheduling 342 include a scheduling cell signaling structure for 'rate control' scheduling 352 and may include one or more additional scheduling cell signaling structures for 'rate control' scheduling 354. The scheduling cell structure(s) for 'time and rate' scheduling 344 include a scheduling cell signaling structure for 'time and rate' scheduling 356 and may include one or more additional scheduling cell signaling structures for 'time and rate' scheduling 358. The non-scheduling cell structure(s) 346 include a non-scheduling cell signaling structure 360 and may include one or more additional non-scheduling cell signaling structures 362. Each set of AG channels 348, 350 may include a plurality of AG channels.

Figure 3D:
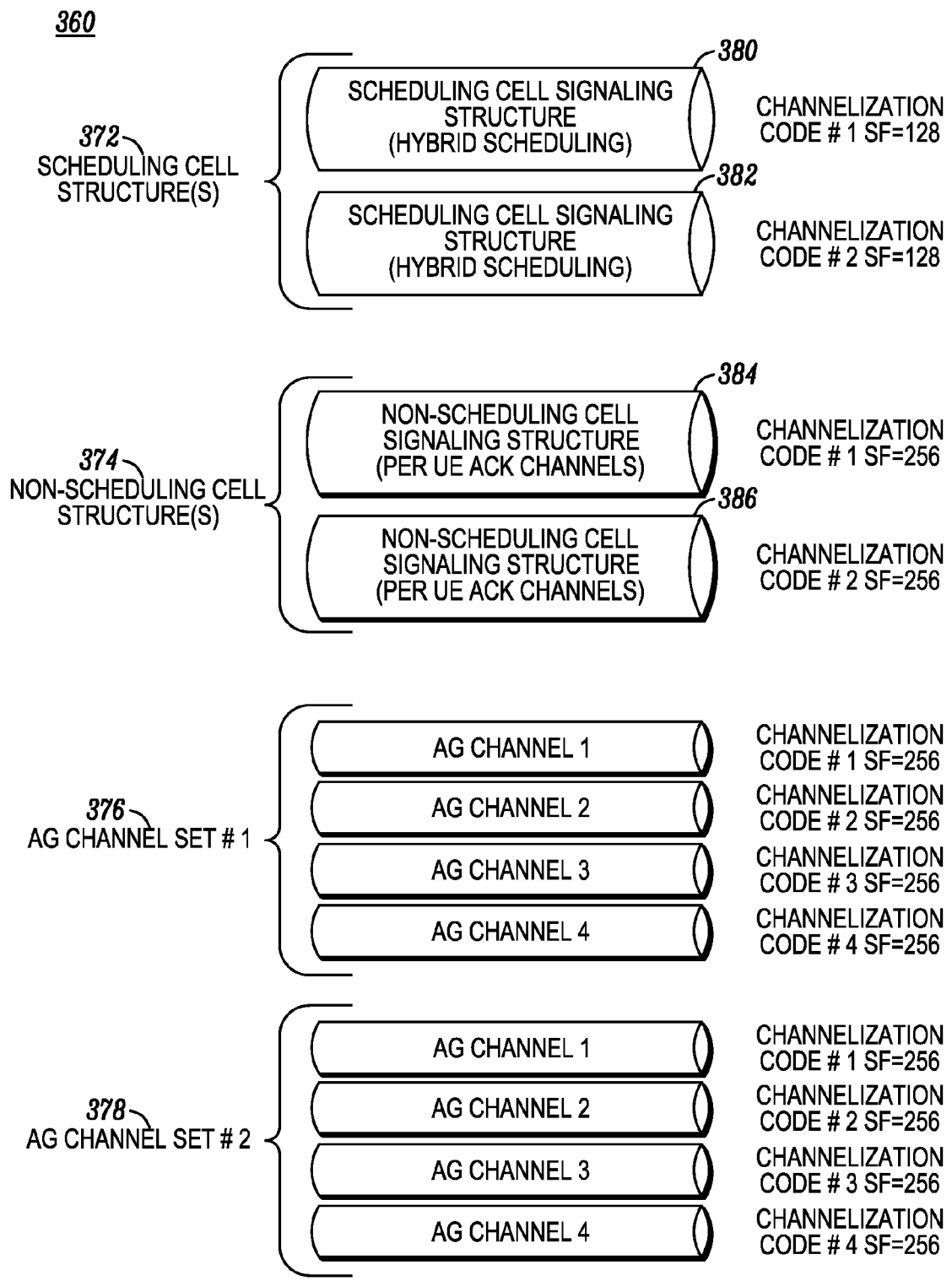

Referring to FIG. 3D, there is shown instantiations of the downlink control channels 370 to support uplink data communications in a high speed packet access network using both 'rate control' and 'time and rate' scheduling but using a composite downlink signaling scheduling cell structure. The downlink control channels 370 for 'Hybrid' scheduling comprise scheduling cell structure(s) for 'Hybrid' scheduling 372, non-scheduling cell structure(s) for 'Hybrid' scheduling 374, and one or more absolute grant (AG) channel sets 376, 378. The scheduling cell structure(s) for 'Hybrid' scheduling 372 include a scheduling cell signaling structure for 'Hybrid' scheduling 380 and may include one or more additional scheduling cell signaling structures for 'Hybrid' scheduling 382. The non-scheduling cell structure(s) for 'Hybrid' scheduling 374 include a non-scheduling cell signaling structure for 'Hybrid' scheduling 384 and may include one or more additional non-scheduling cell signaling structures for 'Hybrid' scheduling 386. Each set of AG channels 376, 378 may include a plurality of AG channels.

Figure 4:
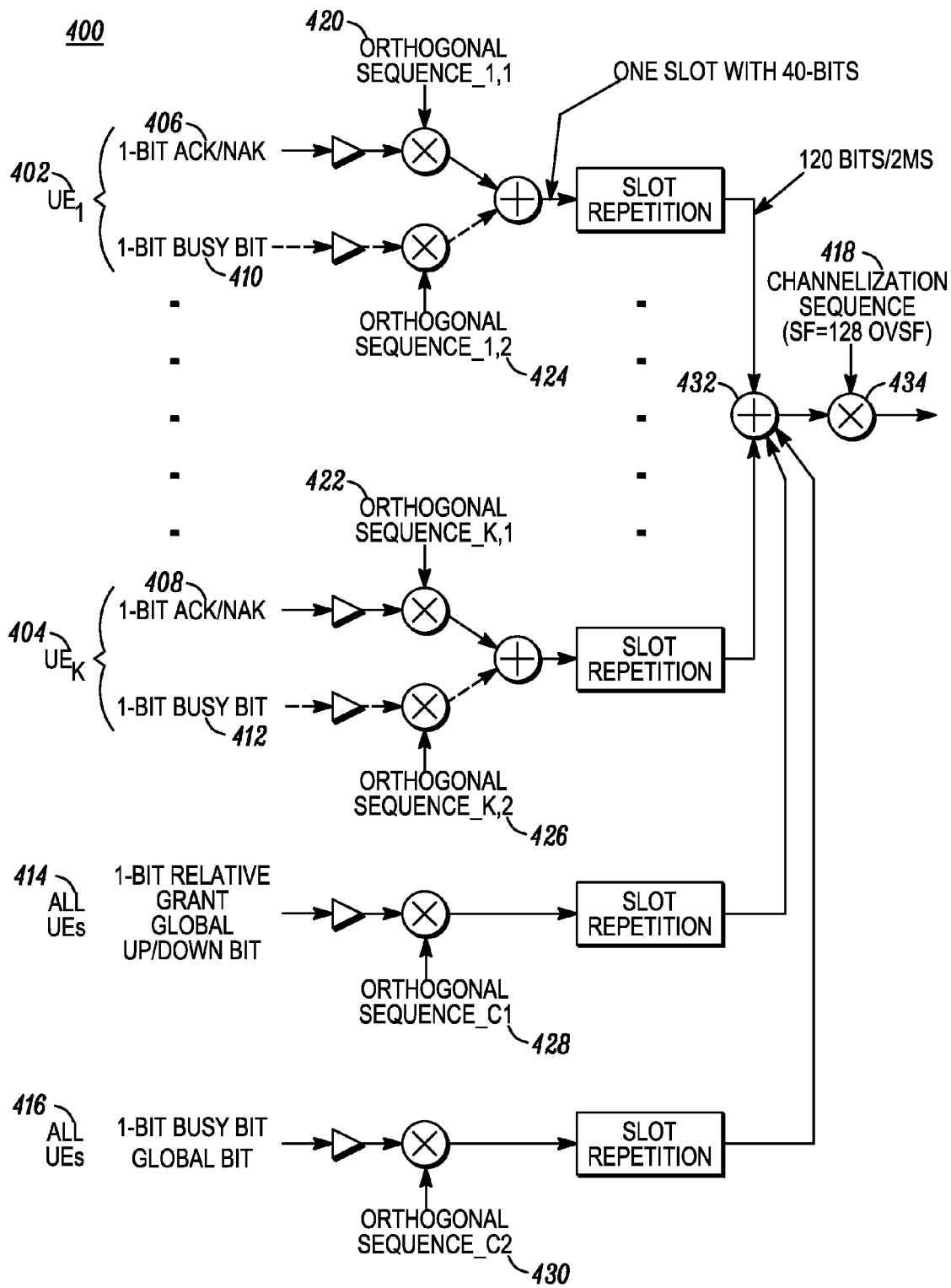
FIG. 4 is a schematic diagram representing a scheduling cell downlink coding structure for controlling uplink data communications in accordance with the present invention.

Referring to FIG. 4, there is shown an example of a scheduling cell downlink coding structure 400 for controlling uplink data communications in a high speed packet access network. The proposed downlink coding structure 400 supports an ACK bit channel 406, 408 for each mobile device, a global (i.e., for all mobile devices) Relative Grant downlink channel 414, and a global Busy bit channel 416. Optionally, the coding structure 400 may also support a Busy bit channel 410, 412 for each mobile device. As shown by example, the proposed downlink coding structure 400 may support mobile devices $UE_1$ 402 through $UE_k$ 404, and the structure may support an ACK/NAK bit channel 406, 408 and a Busy bit channel 410, 412 for each mobile device. Also, for this example, the proposed downlink coding structure 400 may support a global 1-bit relative grant bit 414 and a global 1-bit Busy bit 416.

This structure is for mobile devices scheduled by a given cell. If the cell is a scheduling cell for a mobile device, then the mobile device may be assigned to use this structure to access downlink information necessary to support uplink communications. The Busy bit channels 410, 412, 416 are unnecessary for a 'time and rate' scheduling network, but are useful for a 'rate' controlled scheduling network to control the maximum number of mobile devices that can transmit per Transmission Time Interval (TTI) and/or to constrain the maximum amount of Base station channel resources needed. Active set handoff may be used to transfer 'scheduling cell' status to a different active set cell with the assumption that there may be only one scheduling cell per TTI for a given mobile device.

For example, for the embodiment shown in FIG. 4, there may be a single size 128 OVSF channelization code 418 associated with the structure which supports 19 mobile devices or up to 38 if the per mobile device Busy bits 410, 412 are not assigned. There may be multiple instances of this structure per cell, but mobile devices scheduled by the cell will be assigned a single corresponding OVSF code 418 to monitor at active cell handoff, or simultaneous active cell and soft/softer handoff, or upon mobile device call origination/setup for the cell.

Further, for the exemplary embodiment shown in FIG. 4, upon call origination or setup, at soft or softer handoff, or at active cell handoff to a scheduling cell, each mobile device may also be assigned unique orthogonal sequences 420, 422, 424, 426 for its corresponding ACK and Busy bit channels 406, 408, 410, 412, a unique common orthogonal sequence 428 known by all mobile devices for the Relative Grant (up/down bit) channel, and a unique common orthogonal sequence 430 for the global Busy bit channel. For example, in response to the actions described above, each mobile device may be assigned 40-bit Hadamard orthogonal sequences 420, 422, 424, 426 for the ACK and Busy bit channels, a 40-bit Hadamard orthogonal sequence 428 for the Relative Grant channel, and a 40-bit Hadamard orthogonal sequence 430 for the global Busy bit channel. Each sequence to be transmitted may be repeated over a predetermined number slots of a predetermined TTI, such as 3 slots of a 2 ms TTI, and summed 432 with the other sequences. The sum may be then spread 434 with an OVSF channelization code 418, such as size 128 code, followed by QPSK modulation and scrambling. For one embodiment, as shown in FIG. 4, a larger sequence, such as a 40-bit sequence, is preferred over a shorter sequence, such as a 20-bit sequence, so that fewer channelization codes must be maintained.

Figure 5:
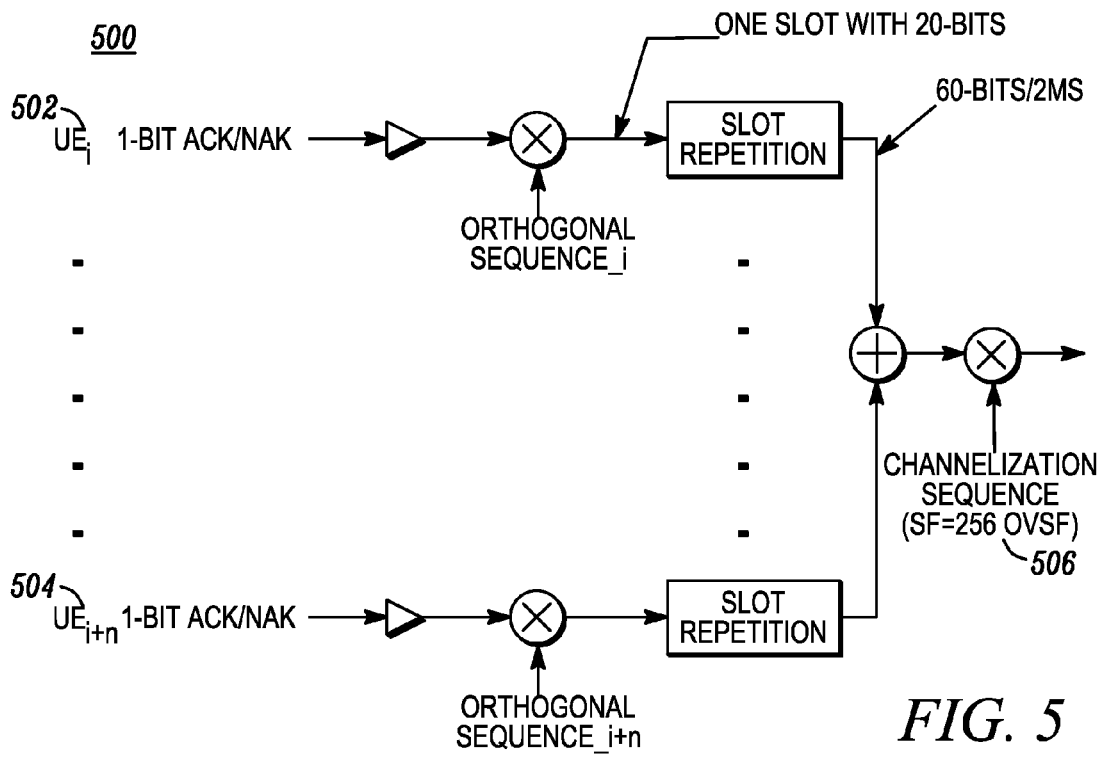
FIG. 5 is a schematic diagram representing a non-scheduling cell downlink coding structure in accordance with the present invention.

Referring to FIG. 5, there is shown an example of the non-scheduling cell downlink coding structure 500 for supporting multiple per mobile device ACK channels 502, 504. This coding structure 500 may be used by mobile devices not scheduled by a given active set cell. Hence, mobile devices monitor a single (size 256) OVSF channelization code 506 corresponding to an instance of this structure at each of their non-scheduling active set cells. For example, for the embodiment shown in FIG. 5, each instance of the structure may support twenty mobile devices and a single corresponding channelization code may be assigned at soft/softer handoff, call origination/setup, or active cell handover. An orthogonal code, such as a 20-bit Hadamard orthogonal code, corresponding to a single ACK channel may also be assigned to each mobile device by the non-scheduling cell at active set handoff or upon soft/softer handoff when the cell is added to the mobile devices active set. For one embodiment, a mobile device's assigned sequence may be transmitted for an ACK and not transmitted for a NACK. It should be noted that a shorter (such as 20-bit) sequence is preferred over the longer (such as 40-bit) sequence since better ACK/NACK coverage may be achieved. Also, the number of non-scheduled users supported by a cell may be minimized to reduce the number of ACK channels needed in the non-scheduling cell downlink coding structure.

Figure 6:
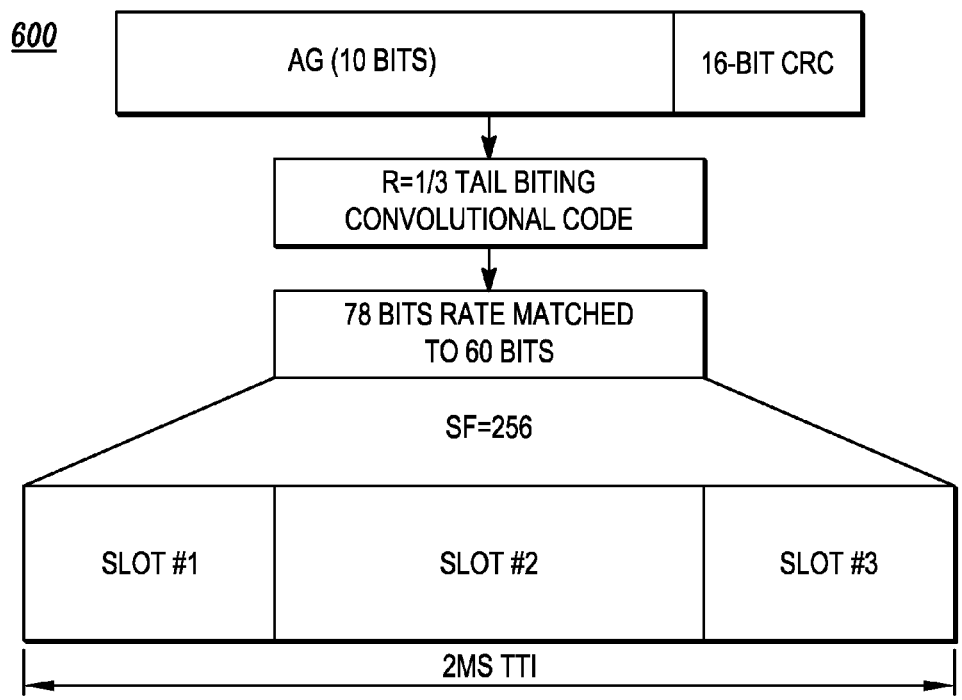
FIG. 6 is a schematic diagram of an absolute grant channel utilized in accordance with the present invention.

Referring to FIG. 6, there is shown an exemplary coding structure of an Absolute Grant (AG) channel which may be used for base station scheduling of mobile device uplink transmissions as would be supported in a 'time and rate' scheduling network. The AG channel may be used to signal the mobile device's rate or power limit information and a proscribed scheduling time interval over which the mobile device may transmit. The AG information (e.g. DPR, CACK, NOP, AGI) may be sent on the AG channel for a specific mobile device. The AG information may be coded using a convolutional code, such as a K=9 Tail biting convolution code. It should be noted that the control channel ACK/NACK (CACK) may be transmitted in response to the previous 2 ms TTI E-DPCCH transmission where an ACK is sent if the control channel is successfully decoded and a NACK is sent otherwise. The mobile device may also use the CACK for E-DPCCH power control. The CACK may also allow for early termination for repeated 2 ms TTI E-DPCCH transmissions used to achieve effective 10 ms TTI for code multiplexed E-DPCH case. The number of outstanding packets (NOP) field indicates how many outstanding packets are permitted. In one embodiment, the number of outstanding packets per scheduling grant is controlled by a 2-bit 'number of outstanding packet' (NOP) field and can be mapped to 1, 4, 6, or unlimited number of packets. The unlimited number of packet case corresponds to a mobile device leaving the 'time and rate' scheduling mode to enter the 'rate control' mode. For 'time and rate' scheduling, this allows for effectively different scheduling intervals where the unlimited case means a mobile device goes into rate scheduled mode and uses the global relative grant (up/down) bit to control its rate selection or power levels and the busy bit to enable or disable its transmission. Once in 'rate scheduled' mode, a mobile device may remain in that mode until it leaves the active state which typically occurs when an inactivity timer expires due to their being no data left to transmit. When entering the active channel state (known as the CELL DCH state in 3GPP WCDMA), user equipment or mobile device (UE) may be assigned to be in either 'time and rate' or 'rate control' scheduling mode. In one embodiment, the absolute grant indicator (AGI) field may be used to indicate which of four AG channelization codes in the AG channelization code set a mobile device should monitor and decode on subsequent AG transmissions for the current HARQ stop-and-wait channel number for which the AGI was received. This allows the mobile device to only have to monitor one AG code per TTI.

For a N-channel stop-and-wait protocol, a user may send one packet on each of the N channels with, for example, 2 ms TTI, where the channels are time offset from one another by one TTI such that there is no overlap or gaps in the mobile device transmissions when all N channels are continuously used. A packet may be sent on stop-and-wait channel i is retransmitted on subsequent occurrences of channel i if the user does not receive an ACK from the receiving entity. It may continue to retransmit the packet on the $i^{th}$ stop-and-wait channel until it receives an ACK or until the maximum number of retransmissions is reached. The user is then free to transmit a new packet on channel i. This procedure may be followed independently for each of the N-channels. The AGI received on the AG channel corresponding to channel i indicates which AG channel number the user should subsequently monitor for channel i. Alternatively, the AGI indicates which AG channel to monitor independent of the stop-and-wait channel number the absolute grant implicitly indicated.

Figure 7:
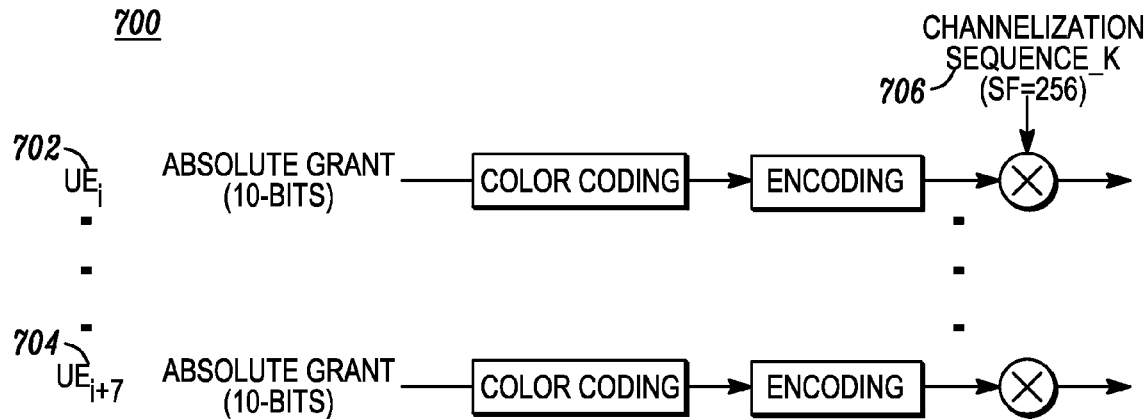
FIG. 7 is a schematic diagram of multiple absolute grant channels allocated per cell in accordance with the present invention.

Referring to FIG. 7, there is shown an exemplary absolute grant (AG) channels 702, 704 allocated per cell. For example, for the embodiment shown, two sets of four AG channels may be allocated per cell with each channel having a corresponding OVSF channelization code 706, 708. One of a cell's AG channel sets, along with the corresponding channelization codes, is assigned to a mobile device when the cell becomes the scheduling cell due to an active set handoff or call origination/setup.

Figure 8:
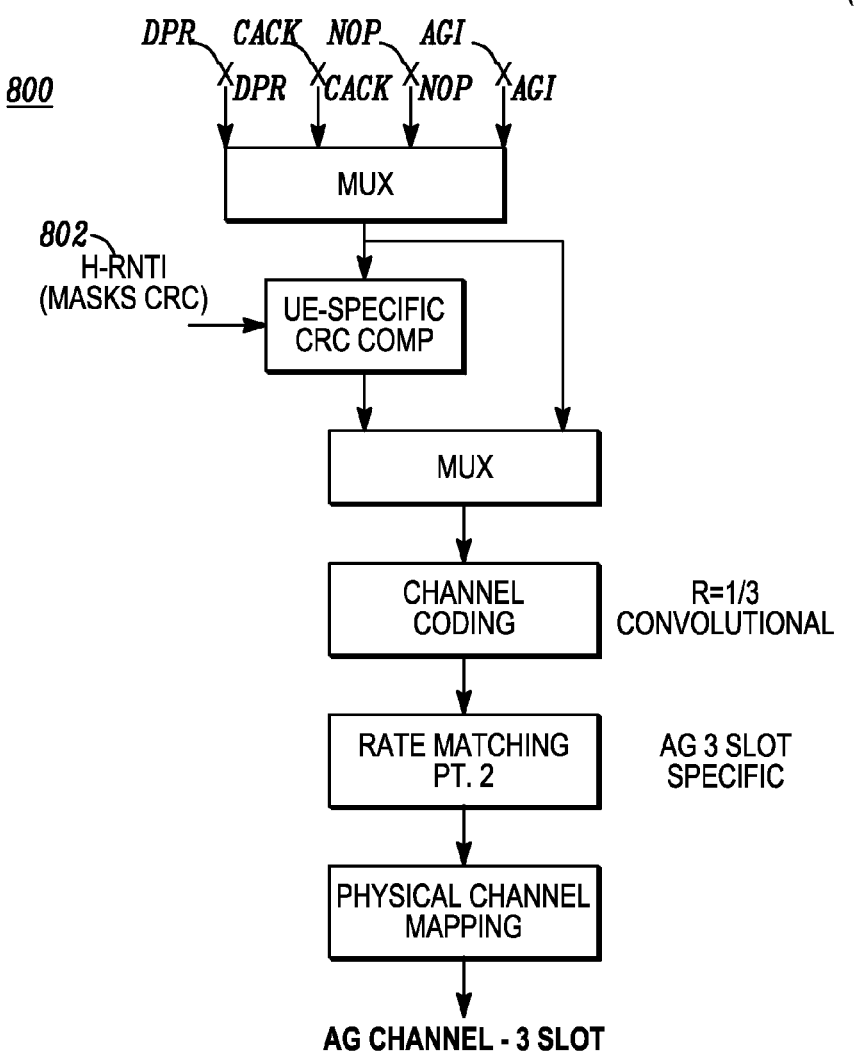
FIG. 8 is a schematic diagram of a color coding scheme utilized in accordance with the present invention.

Referring to FIG. 8, there is shown the H-RNTI color coding scheme 800 used with the AG. Each AG channel is color coded by a unique mobile device ID (H-RNTI 802) to allow the mobile device to determine whether it is the target of a transmitted grant and thereby reducing the likelihood of erroneous grants.

Figure 9:
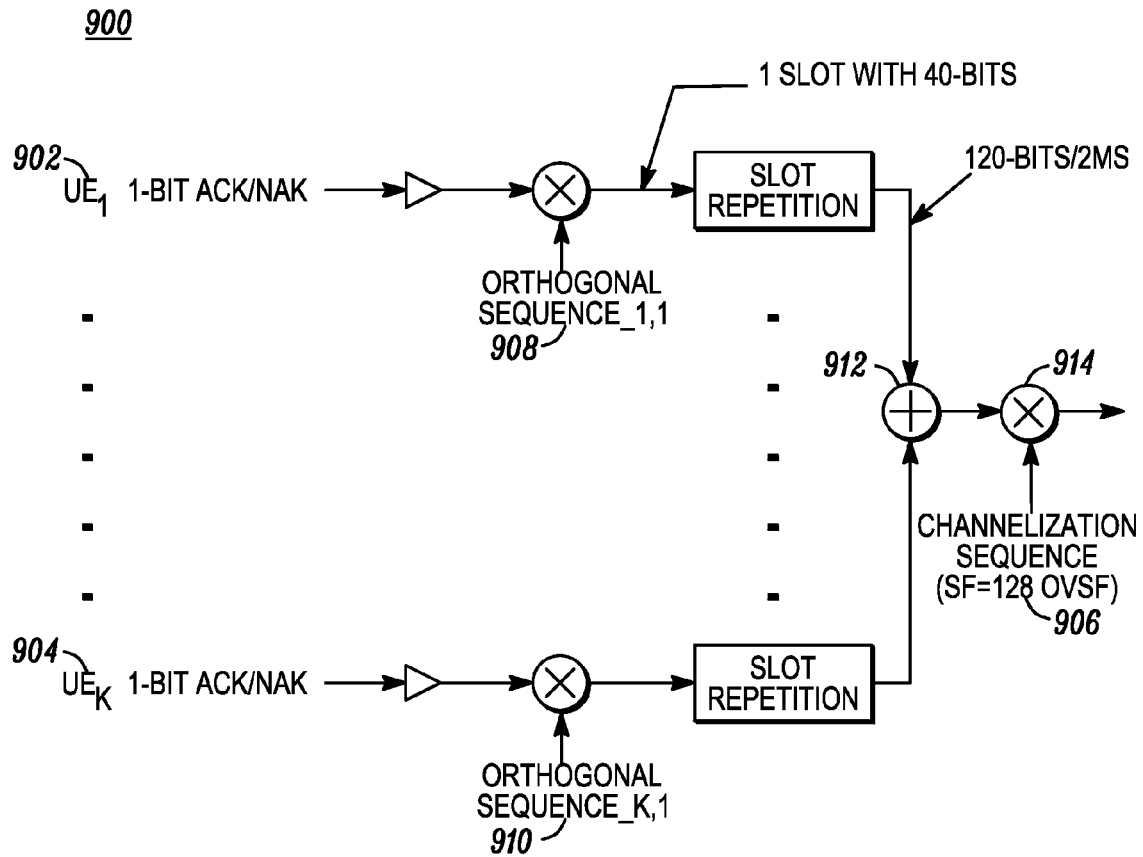
FIG. 9 is a schematic diagram representing another scheduling cell downlink coding structure for controlling uplink data communications in accordance with the present invention.

Referring FIG. 9, there is shown an example of another scheduling cell downlink coding structure 900 for controlling uplink data communications in a high speed packet access network used in conjunction with the AG channels. The proposed downlink structure supports the scheduling cell's per mobile device $UE_1$ through $UE_k$ ACK channels 902, 904 for a 'time and rate' scheduling network. Active set handoff is used to transfer 'scheduling cell' status to a different active set cell with the assumption that there may be only one scheduling cell per TTI for a given mobile device. For example, for the embodiment shown, there may be a single size 128 OVSF channelization code 906 associated with each instantiation of the structure which supports a maximum number of mobile devices. There may be multiple instances of this structure for a cell but mobile devices scheduled by the cell will be told which OVSF code to monitor at active cell handoff. During the active cell handoff to the new scheduling cell, each mobile device is also assigned unique orthogonal sequences 908, 910 for its corresponding ACK channel 902, 904. For example, each sequence to be transmitted may be repeated over 3 slots of a 2 ms TTI and summed 912 with the other sequences. The sum is then spread 914 with an OVSF channelization code followed by QPSK modulation and scrambling. In this case a larger (in this case 40-bit) sequence is preferred over a shorter (e.g. 20-bit) one so that fewer channelization codes must be maintained.

Figure 10:
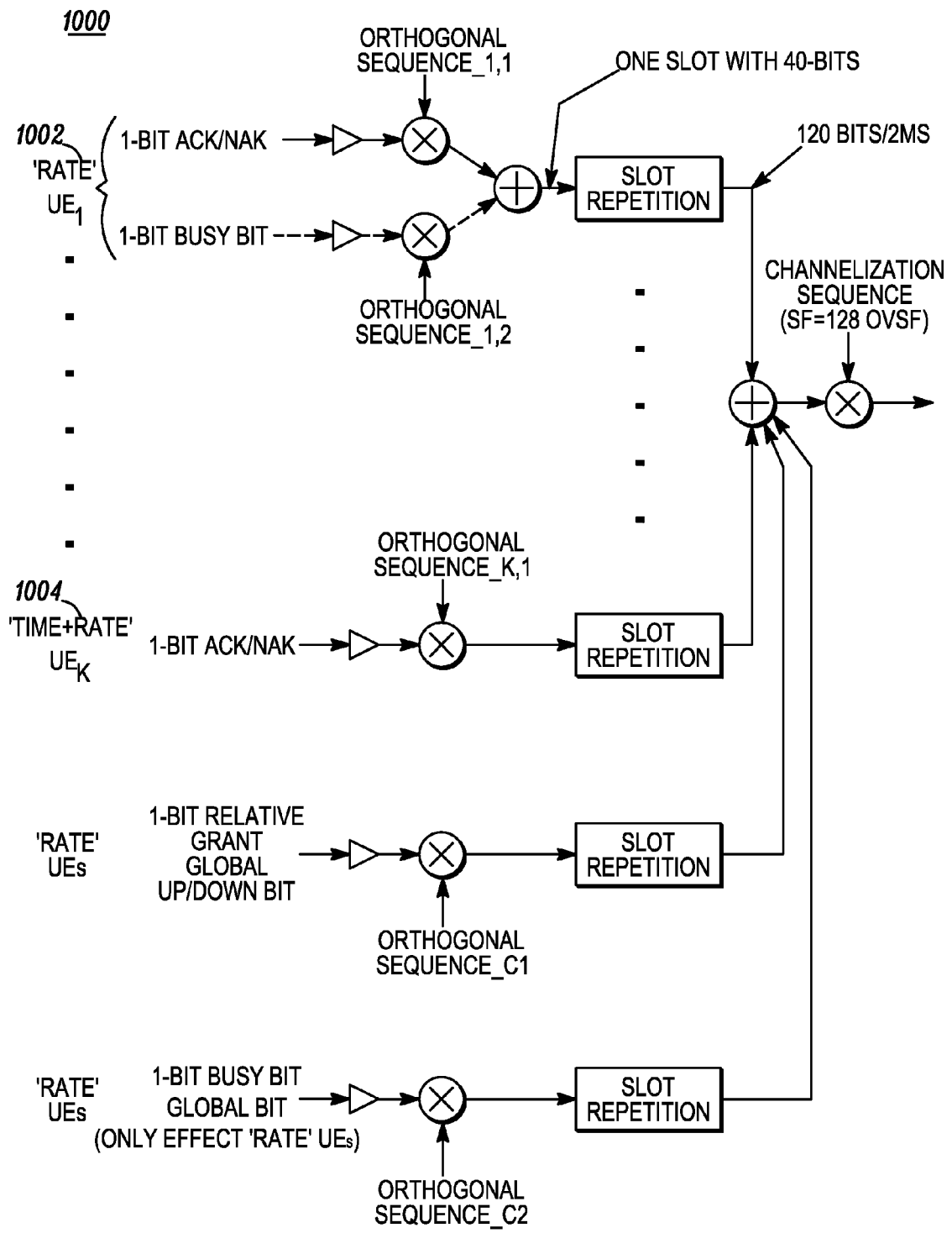
FIG. 10 is a schematic diagram representing a hybrid scheduling cell downlink coding structure for controlling uplink data communications in accordance with the present invention.

Referring to FIG. 10, there is shown yet another embodiment of the scheduling cell coding structure. In particular, a hybrid scheduling cell coding structure 1000 includes one or more 'rate control' ACK/NAK channels 1002, per mobile device Busy bit channels 100$x$ as well as a global relative grant channel 100$x$ and global busy bit channel 100$x$ as well as one or more 'time and rate' ACK/NAK channels 1004 and, thus, may support mobile devices in either 'rate control' or 'time and rate' scheduling mode. Accordingly, one channelization code provides a structure that supports both 'rate control' and 'time and rate' scheduled mobile devices.

Figure 11:
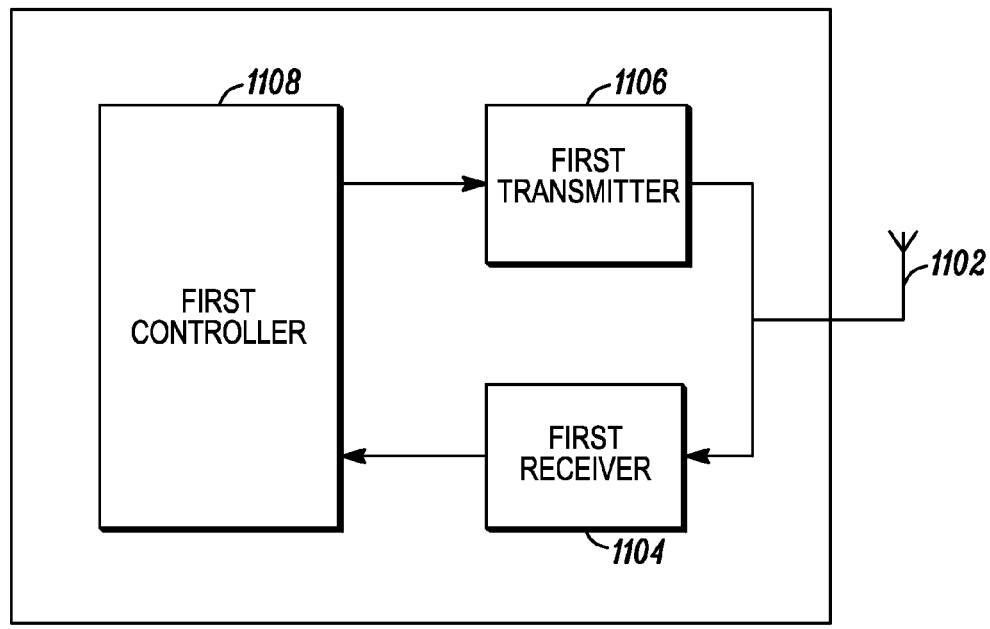
FIG. 11 is a block diagram representing an exemplary mobile device of the wireless communication system of FIG. 1.

Referring to FIG. 11, there is shown an exemplary mobile device 1100 of the wireless communication system 100 of FIG. 1. For clarity and brevity, FIG. 11 illustrates only functionality of the mobile devices 128, 130 required for describing the embodiments to a person skilled in the art. Thus, in addition to the functional elements illustrated in FIG. 11, the mobile devices may typically comprise other functionality required or desired for communicating in accordance with the wireless communication Technical Specifications as will be well known to the person skilled in the art.

FIG. 11 comprises an antenna 1102 which is coupled to a first receiver 1104 and a first transmitter 1106 (for example through a duplexer (not shown)). The first receiver 1104 comprises functionality for receiving signals transmitted from one or more base stations over the air interface and the first transmitter comprises functionality for transmitting signals to one or more base stations over the air interface. The first receiver 1104 and the first transmitter 1106 are coupled to a first controller 1108.

Figure 12:
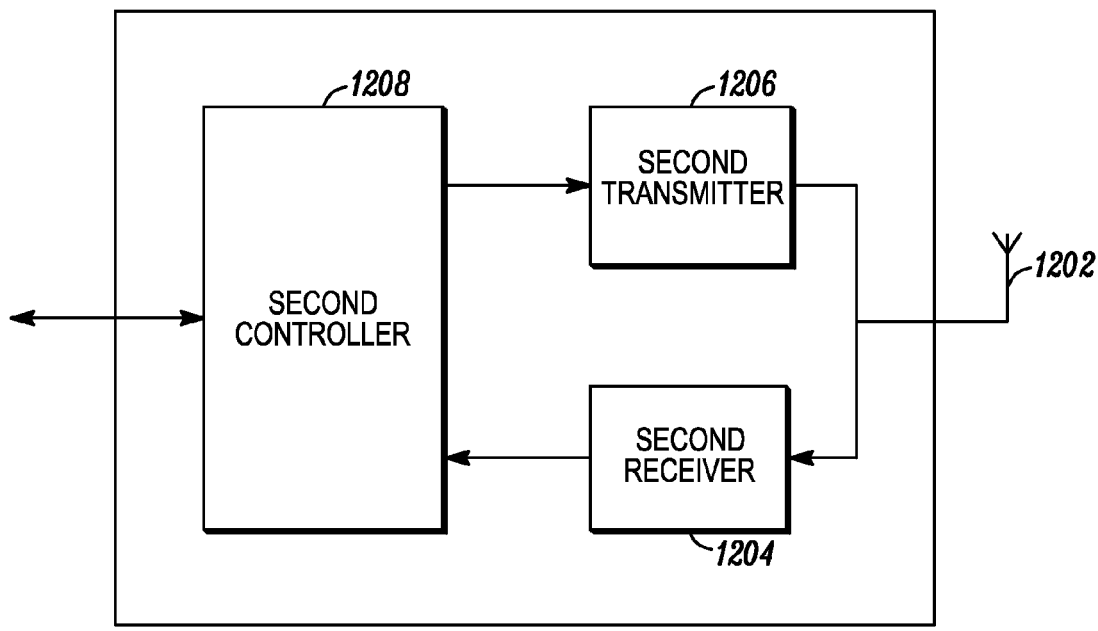
FIG. 12 is a block diagram representing an exemplary base station of the wireless communication system of FIG. 1.

FIG. 12 illustrates a soft handover base station 1200 of the wireless communication system 100 of FIG. 1. For clarity and brevity, FIG. 12 illustrates only functionality of the base station 114, 116, 118, 120 required for describing the embodiment to a person skilled in the art. Thus, in addition to the functional elements illustrated in FIG. 12, the base station may typically comprise other functionality required or desired for communicating in accordance with the wireless communication Technical Specifications as will be well known to the person skilled in the art.

The base station 1200 comprises an antenna 1202 coupled to a second receiver 1204 which receives signals transmitted from user equipments over the air interface. The second receiver 1204 is coupled to a controller 1206 which receives data from the second receiver 1204 for outputting to the fixed network and in particular to an RNC (not shown). The controller 1206 is further operable to control the second receiver 1204 and to address other network elements in the fixed network.

The base station 1200 comprises an antenna 1202 which is coupled to a second receiver 1204 which receives signals transmitted from user equipments over the air interface and a second transmitter 1206 which sends signals transmitted to user equipments over the air interface. The second receiver 1204 comprises functionality for receiving signals transmitted from one or more user equipments over the air interface and the second transmitter 1206 comprises functionality for transmitting signals to one or more user equipments over the air interface. The second receiver 1204 and the second transmitter 1206 are coupled to a controller 1208.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. User equipment for providing high speed uplink packet access to a base station comprising:
    a transmitter configured to transmit data packets to the base station;
    a receiver configured to receive control information from the base station which correspond to the data packets transmitted to the base station, the control information including at least a control channel acknowledgement field in an absolute grant channel assigned to the user equipment, the control information further including a busy bit; and
    a controller, coupled to the transmitter and receiver, configured to utilize the control channel acknowledgement field in response to one of handoff and entering an active channel state, the controller being further configured to change an attribute used by the user equipment to determine at least one of the uplink transmission rate and power level of the transmitter.

2. The user equipment of claim 1, wherein the busy bit is a global busy bit to disable uplink transmission of a plurality of user equipment.

3. User equipment for providing high speed uplink packet access to a base station comprising:
    a transmitter configured to transmit data packets to the base station;
    a receiver configured to receive control information from the base station which correspond to the data packets transmitted to the base station, the control information including at least a control channel acknowledgement field in an absolute grant channel assigned to the user equipment, the control information further including a relative grant bit; and
    a controller, coupled to the transmitter and receiver, configured to utilize the control channel acknowledgement field in response to one of handoff and entering an active channel state, the controller being further configured to change an attribute used by the user equipment to determine at least one of the uplink transmission rate and power level of the transmitter.

4. The user equipment of claim 3, wherein the relative grant bit is a per user equipment relative grant bit.

5. User equipment for providing high speed uplink packet access to a base station comprising:
    a transmitter configured to transmit data packets to the base station;

a receiver configured to receive control information from the base station which correspond to the data packets transmitted to the base station, the control information including at least a control channel acknowledgement field in an absolute grant channel assigned to the user equipment; and a controller, coupled to the transmitter and receiver, configured to utilize the control channel acknowledgement field in response to one of handoff and entering an active channel state, wherein the control information including the at least a control channel acknowledgement field in an absolute grant channel is indicated by color coding the absolute grant channel with a radio network temporary identifier associated with the user equipment.

* * * * *